United States Patent
Soni et al.

(10) Patent No.: US 10,902,419 B2
(45) Date of Patent: Jan. 26, 2021

(54) BLOCKCHAIN-BASED SYSTEM FOR EFFICIENT STORAGE AND RETRIEVAL OF DISPARATE SUPPLY-SIDE TRANSACTION INFORMATION

(71) Applicant: Omnichain Solutions Inc., Los Angeles, CA (US)

(72) Inventors: Pratik Soni, Porter Ranch, CA (US); Richard Gunawan, Chula Vista, CA (US)

(73) Assignee: Omnichain Solutions Inc., Los Angeles, CA (US)

( * ) Notice: Subject to any disclaimer, the term of this patent is extended or adjusted under 35 U.S.C. 154(b) by 0 days.

(21) Appl. No.: 16/798,779

(22) Filed: Feb. 24, 2020

(65) Prior Publication Data

US 2020/0273026 A1    Aug. 27, 2020

Related U.S. Application Data

(60) Provisional application No. 62/809,452, filed on Feb. 22, 2019.

(51) Int. Cl.
*G06Q 20/38* (2012.01)
*H04L 9/06* (2006.01)

(52) U.S. Cl.
CPC ....... *G06Q 20/3827* (2013.01); *H04L 9/0643* (2013.01); *G06Q 2220/00* (2013.01); *H04L 2209/38* (2013.01); *H04L 2209/56* (2013.01)

(58) Field of Classification Search
CPC .......... G06Q 20/3827; G06Q 2220/00; G06Q 20/401; G06Q 20/389; G06Q 10/0833;
(Continued)

(56) References Cited

U.S. PATENT DOCUMENTS

2015/0169253 A1*  6/2015  Donlan ................ G06F 3/0647
                                                         711/161
2017/0364552 A1* 12/2017  Pattanaik ............. H04L 9/3297
(Continued)

OTHER PUBLICATIONS

Michail Sidorov, Ultralightweight Mutual Authentication RFID Protocol for Blockchain Enabled Supply Chains, IEEE (Year: 2019).*

*Primary Examiner* — Neha Patel
*Assistant Examiner* — Chunling Ding
(74) *Attorney, Agent, or Firm* — Knobbe, Martens, Olson & Bear, LLP

(57) ABSTRACT

Systems and methods for a blockchain-based system for efficient storage and retrieval of disparate supply-side transaction information. An example embodiment includes features to receive a transaction from a provider system; aggregate the received transaction with a plurality of other transactions, wherein each transaction is encrypted; generate one or more hashes associated with the aggregated transactions, and broadcast the generated hashes onto a blockchain of a blockchain network; store the encrypted transactions and generated hashes, wherein the computer system is configured to respond to a search request received from a user, and wherein the computer system is further configured to validate stored transactions which are responsive to the search request via comparison to the generated hashes on the blockchain.

15 Claims, 5 Drawing Sheets

(58) Field of Classification Search
CPC ............... H04L 9/0643; H04L 2209/56; H04L 2209/38; H04L 9/3239; H04L 9/3247; H04L 9/0637; H04L 9/3236
See application file for complete search history.

(56) References Cited

U.S. PATENT DOCUMENTS

| | | | |
|---|---|---|---|
| 2019/0013948 A1* | 1/2019 | Mercuri | H04L 9/3239 |
| 2019/0050831 A1* | 2/2019 | Kikinis | G06Q 20/389 |
| 2019/0260592 A1* | 8/2019 | Nguyen | G06Q 10/0832 |
| 2019/0340013 A1* | 11/2019 | Cella | G06F 16/182 |
| 2019/0385120 A1* | 12/2019 | Yund | H04L 63/123 |
| 2020/0067696 A1* | 2/2020 | Sarin | H04L 9/3239 |
| 2020/0250683 A1* | 8/2020 | Padmanabhan | G06Q 30/018 |

* cited by examiner

BLOCKCHAIN-BASED SYSTEM FOR EFFICIENT STORAGE AND RETRIEVAL OF DISPARATE SUPPLY-SIDE TRANSACTION INFORMATION

INCORPORATION BY REFERENCE TO ANY PRIORITY APPLICATIONS

This application claims priority to U.S. Provisional Patent Application No. 62/809,452 titled "BLOCKCHAIN-BASED SYSTEM FOR EFFICIENT STORAGE AND RETRIEVAL OF DISPARATE SUPPLY-SIDE TRANSACTION INFORMATION" and filed on Feb. 22, 2019, the disclosure of which is hereby incorporated herein by reference in its entirety.

Any and all applications for which a foreign or domestic priority claim is identified here or in the Application Data Sheet as filed with the present application are hereby incorporated by reference under 37 CFR 1.57.

BACKGROUND

A supply chain may include multiple parties which implement distinct elements of supplying a product or service. For example, a first party may represent a manufacturing party. In this example, the first party may produce a product (e.g., a mobile device). A second party may then receive the produced products, and deliver them to one or more third parties to be provided to end-consumers. The second party may therefore represent a shipping entity. It may be appreciated that these different parties may generate information of use to themselves and other parties. Examples of generated information may include supply chain information, such as times at which products are created or shipped, serial numbers of products being shipped, and so forth. As an example, it may be advantageous for a third party, which provides a product to end-consumers, to have easy access to incoming product serial numbers. In this example, the third party may easily monitor the products which are being shipped to them via serial numbers. The third party may then easily monitor which of the products end up with end-consumers based on the associated serial numbers.

At present, there is no technical scheme for easy, and secure, interoperability between such different parties. Additionally, there is no technical scheme to ensure that such generated data is assured to be trustworthy to the different parties.

SUMMARY

Particular embodiments of the subject matter described in this specification can be implemented so as to realize one or more of the following advantages. A system described herein may communicate with different parties (herein referred to as 'providers'), such as supply-chain providers, and securely store transaction information generated by the providers. Advantageously, to ensure immutability of the transaction information the system described herein may leverage one or more blockchain networks. Examples of a blockchain network may include Ethereum, Hyperledger, and so on. As will be described, the system may store information associated with multitudes of transactions (e.g., thousands, millions, hundreds of millions), in blocks of the example blockchain network. Via this stored information, the system may enable the rapid sharing, searching, and verifying, of transaction information received from disparate providers. In this way, the techniques described herein may allow providers to analyze, track and/or manage product lifecycles, from source to shelf.

The transaction information received from providers may comprise different elements or features associated with a same transaction. For example, a provider may indicate that a certain model of a mobile device, with a certain serial number or mac address, is being shipped via a particular carrier to a particular other provider (e.g., retailer). In general, a received transaction may indicate one or more of the following examples of transaction information. An example of transaction information received from one or more providers may include timestamp information. Example timestamp information may include times at which products were produced, times at which components for a product were produced or utilized for assembly, times at which products were shipped or arrived places, times at which products were sold, and so on. Another example of transaction information may include identifying information. Example identifying information may include serial numbers of products, MAC addresses or unique Bluetooth addresses, and so on. Additional examples of transaction information may include purchase information, invoice information, manufacturing information, and so on.

It may be appreciated that the system may receive substantial numbers of transactions of a scale which makes it impractical to store the transaction information itself in blocks of the blockchain. For example, certain blockchain networks (e.g., Ethereum) may require a fee to store information in the blockchain (e.g., via a smart contract). Thus, instead of including one or more transactions in a block, the system may cause a blockchain network to store information associated with received transactions. The stored information may reflect one or more hashes (e.g., cryptographic hashes) generated from an aggregation of received transactions. In some embodiments, the stored information may reflect information generated from a Merkle tree in which leaf nodes of the tree represent individual transactions.

As will be described, the above-described transactions themselves (e.g., encrypted versions of the transactions) may be stored by one or more storage systems. Via the unique technical scheme described herein, the stored transactions may be readily located, and validated, by the information included in blocks of the blockchain. Thus, the blocks of the blockchain network may include summarized, or compressed, information generated from the received transactions.

Advantageously, the techniques described herein enable real-time (e.g., substantially real-time) searching of received transactions. Blockchains may not provide for search functionality sufficient to respond to detailed, and real-time, search requests. As will be described, the techniques described herein enable searching of transactions to be performed, which leverage the immutability of the blockchain. For example, end-users may utilize mobile devices, web interfaces, and so on, to provide requests to the system. The system may analyze the search requests and utilize an example search scheme (e.g., inverted indices) to identify transactions responsive to the search requests. The system may then obtain encrypted versions of identified transactions, and provide decrypted versions upon validating authorization information associated with an end-user.

In this way, the techniques described herein address technological problems and enable practical applications via the described technical features. For example, providers involved in a same supply-chain may utilize the techniques described herein to effortlessly publish transactions to the blockchain. The providers in the supply-chain may therefore leverage information broadcast to the blockchain. For example, a provider associated with manufacturing products may broadcast transactions indicating serial numbers of products destined for specific retailers. The retailers may subscribe to these transactions, and have immediate knowledge of the products being shipped to them. Advantageously, the providers may utilize an application, or engine, associated with the system to enable such immediate broadcasting. In this way, the providers may avoid using blockchain experts or highly specialized software or techniques. Instead, the providers may leverage the application programming interfaces (APIs) associated with the system. Through use of the blockchain, the providers may have assurances as to the validity of all transaction information received from the system. For example, the providers may utilize the search functionality described herein to retrieve particular transactions. Due, at least in part, to utilization of the blockchain, the retrieved transactions may be assured to be accurate.

Additional embodiments of the disclosure are described below in reference to the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above-and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

DETAILED DESCRIPTION

Figure 1A:
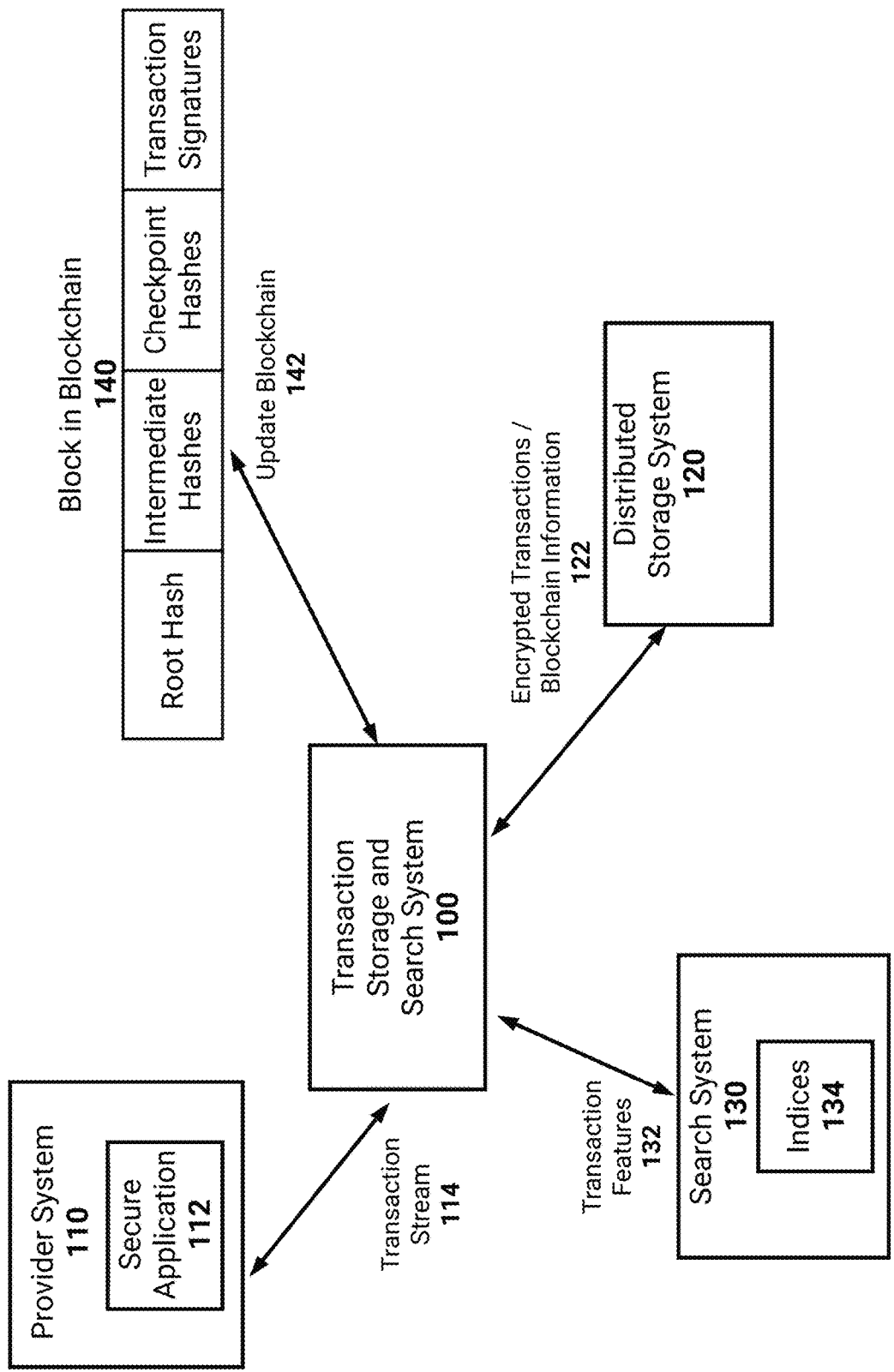
FIG. 1A illustrates an example transaction storage and search system publishing information to an example blockchain.

This specification describes a system that receives transactions from providers, and enables secure storage and searching of the transactions based on use of one or more blockchain networks. The system may be, for example, the transaction storage and search system 100 described in FIGS. 1A-1B below. As described herein, a transaction may represent discrete information related to one or more products, services, and so on. The providers may form part of a supply chain network associated with the products, services, and so on. For example, a product may include electronic hardware (e.g., a tablet). In this example, transactions may be received which relate to the tablet. As an example, a transaction may indicate when a particular tablet was manufactured, shipped, and so on. Example providers may therefore include manufacturers, licensors, retailers, users, shipping entities, and so on.

Since the transactions may be received from different providers, the system may leverage a blockchain network to ensure that the included transaction information is immutable. As will be described, the system may receive transactions (e.g., as a stream) from secure applications, or engines, executing on systems controlled by providers. Advantageously, as each transaction is received the system may encrypt the transaction utilizing a secret key or code as described below. The system may then aggregate the transactions, for example into a grouping of 1000. Due to the volume of transaction information which may be provided by the providers, the system may advantageously limit an extent to which information is required to be included in blocks of the blockchain network. In this way, costs associated with utilization of a publicly-accessible blockchain network may be constrained. To limit the information, the system may include hashes associated with the grouping of transactions in a block.

With continued reference to the example of 1000 transactions, the system may generate a hash (e.g., cryptographic hash) of each of the 1000 transactions. The system may then generate a threshold number of groups of the generated hashes. For example, the system may generate four groups each with 250 of the 1000 hashes corresponding to the 1000 transactions. The system may then generate a hash of each group of hashes, which herein is referred to as a checkpoint hash. In this example, the system may generate four checkpoint hashes. To further refine the hashes, the system may then generate additional hashes from the four checkpoint hashes. For example, the system may generate two groups each with 2 of the checkpoint hashes. The system may then generate a hash of each group, which herein is referred to as an intermediate hash. For example, the system may generate two intermediate hashes from the four checkpoint hashes. The resulting two intermediate hashes may then be hashed to generate a root hash. In some embodiments, the hashing may therefore represent a Merkle tree associated with the received 1000 transactions.

Optionally, the system may generate a threshold number of signatures from the received transactions (e.g., utilizing MD5, SHA1, and so on). With respect to the above example of 1000 transactions, the system may access the four groups each with 250 of the 1000 transactions. The system may then generate four signatures based on respective groups of 250 transactions. These signatures may ensure the validity of transaction data, as will be described below. It will be understood that the transactions may be divided into any number of different sized groups as desired. Furthermore, it will be understood that the system can generate signatures for any number of groups of the transactions or for each transaction as desired.

The system may then update the blockchain network, for example by broadcasting a proposed block for inclusion in the blockchain network. This proposed block may include the checkpoint hashes, intermediate hashes, root hash, and signatures, associated with the 1000 transactions. In some embodiments, the system may utilize a smart contract to store the above-described hashes and signatures. It will be understood that the system can store more or less information as desired. For example, in some blockchain networks, such as a private blockchain (e.g., Hyperledger), the system can store each transaction or a hash of each transaction in the blockchain, as well as the checkpoint hashes, intermediate hashes, root hash, and signatures, etc.

To enable searching of the received transactions, the system may leverage particular search techniques. Example search techniques may be based on Elasticsearch, Cassandra, and so on. For example, the system may utilize Elasticsearch to generate, in substantially real-time as transactions are received, indices based on features or elements included in the transactions. The indices may be inverted indices which map the features or elements to associated transactions. As an example, an inverted index may enable the easy identification of transactions which involve a particular serial number of a product. In some embodiments, Elasticsearch may have access to databases which store encrypted versions of the transactions. In this way, the system may identify transactions responsive to a search request and access the transactions.

Optionally, the system may utilize a separate storage system, engine, or module, to store the transactions. In this example, the system may utilize Elasticsearch to identify transactions responsive to a received search query. To access the identified transactions, the system may store encrypted versions of the transactions in the separate storage system. The storage system may also replicate the information included in the blockchain. Upon identification of responsive transactions by, for example, Elasticsearch, the system may then obtain the transactions from the storage system.

In some embodiments, the system may store encrypted versions of the received transactions. Prior to providing decrypted versions of the transactions to a requesting user, the system may authenticate the user. As will be described, the requesting user may utilize a certificate, token (e.g., OAuth token), and so on, to provide authentication information. Additionally, the system may validate that the user is authorized to view the transactions. The requesting user may also provide cryptographic primitives, such as digital signatures. For example, it may be appreciated that the transactions received from a first provider may not be shared with users from a second provider. Thus, the system may confirm authorization to view the transactions.

Advantageously, the system may confirm validity of the transactions as stored by the system. For example, the system may confirm that the transactions have not been improperly tampered with (e.g., by malicious actors). As an example, the system may periodically re-compute hashes, signatures, and so on, of the stored transactions. If a checkpoint hash differs from the checkpoint hash stored in the blockchain, then the system may generate an alert. The alert may indicate that one or more transactions from which the checkpoint hash was generated has been manipulated.

The description above focused on transactions being received from different providers and information associated with the transactions stored in one or more blockchains. In some embodiments, different providers may use their own blockchains (e.g., private blockchains). In these embodiments, the providers may broadcast transactions on their respective blockchains. The system described herein may subscribe to the blockchains and/or otherwise obtain blocks being added to the blockchains. The system may then store the transactions according to the techniques described herein. For example, the system may store the transactions and may generate hashes for inclusion in blocks of one or more blockchain networks as described above.

In this way, the transactions being broadcast by providers may be immutably stored by the system. Different providers may therefore leverage the searching techniques described herein. For example, a first provider's transactions may be obtained from a private blockchain associated with the first provider. In this example, the system may store the first provider's transactions. A second provider may then utilize the searching techniques described herein to search transactions of the first provider.

Furthermore, and as will be described below, in some embodiments the system may allow for smart contracts to be stored on one or more blockchains. A smart contract may represent a digital contract between two or more parties and may comprise logic associated with inputs, outputs, and so on. In some embodiments, the smart contract may include a schema identifying data elements required for execution and fulfillment of the smart contract. In some embodiments, each blockchain network may be associated with its own schema which used for the associated blockchain. The smart contract may also include logic, such as business rules defined in the schema and agreed to by particular providers. The parties may be associated with cryptographic primitives (e.g., digital signatures, private keys) such that they may be referenced in the smart contract. Optionally, external sources may be identified in the smart contract. These may be used for external input of data or triggers required to fulfill the execution of the smart contract. For example, an oracle may be used to provide information for use by the logic included in the smart contract. The oracle may obtain information from an external source (e.g., a system of one or more computers, a database, and so on), and may be trusted to provide information to the system or a node processing the smart contract.

A smart contract may be used to automate certain aspects of a supply chain. For example, a first provider and a second provider may cause generation of a smart contract which indicates that certain actions are to be performed based on satisfaction of certain logic. In this example, the smart contract may cause money to be transferred to the first party based on the second party shipping a certain number of products. Advantageously, the system described herein may determine whether the logic has been satisfied. For example, the system may determine whether the second party shipped the certain number of products. In this example, the system may analyze transaction information being received from the second party. The system may also analyze a blockchain (e.g., a private blockchain) associated with the second party. The system may thus validate that the logic included in the smart contract has been satisfied. In response, the system may effectuate monetary transfer to the first party. In some embodiments, the monetary transfer may comprise digital currency (e.g., bitcoin, Ethereum, and so on), a bank transfer, and so on.

Example Block Diagrams

FIG. 1A illustrates an example transaction storage and search system 100 publishing information to a block 140 in an example blockchain. The transaction storage and search system 100 may represent a system of one or more computers, one or more virtual machines executing on a system of one or more computers, and so on. As described above, the transaction storage and search system 100 may receive a transaction stream 114 comprising multitudes of transactions, and update a blockchain 140 based on the transactions. While the example of FIG. 1A illustrates a single provider system 110, it may be understood that the system 100 may receive transaction streams 114 from multitudes (e.g., hundreds, thousands, and son) of providers.

As illustrated, the transaction storage and search system 100 may receive the transaction stream 114 from an example provider system 110. The provider system 110 may represent a computing system controlled by a provider associated with an example supply-chain. Advantageously, the provider system 110 may execute a secure application 112 to communicate with the transaction storage and search system 100. The secure application 112 may optionally be obtained from an electronic application store (e.g., as an 'app'). The secure application 112 may identify transactions to be provided (e.g., pushed) to the transaction storage and search system 100. For example, the secure application 112 may integrate, or otherwise interface, with databases, stream processing elements, and so on, which are utilized by the associated provider. The secure application 112 may therefore obtain discrete transactions, and push the transactions for storage by the transaction storage and search system 100.

The secure application 112 may additionally authenticate with the transaction storage and search system 100. For example, one or more users may provide authentication information associated with the provider to the secure application 112. The secure application 112 may provide the authentication information to the transaction storage and search system 100. In response, the transaction storage and search system 100 may provide a certificate confirming the authentication of the provider system 100. The certificate may be utilized when providing the transaction stream 114 to authenticate the provider. In some embodiments, the transaction storage and search system 100 may provide an authentication token to the provider system 110. Similar to the above, the token may be utilized to authenticate the provider system 110.

Utilizing the secure application 112, the system provider system 110 may thus provide transactions for storage by the transaction storage and search system 100. Via a quick set-up, the secure application 112 may utilize one or more application programming interfaces (APIs) of the transaction storage and search system 100. In this way, the provider associated with the provider system 110 may leverage the benefits of the storage and searching techniques described herein, without being required to utilize blockchain experts.

For each transaction received from the provider system 110, the transaction storage and search system 100 may encrypt the transaction. For example, the transaction storage and search system 100 may utilize a secret key or code to encrypt the transaction. The secret key or code may optionally be generated by the system or may be received from a secure element which generates such codes (e.g., periodically). In this way, the transactions may be safeguarded against improper access.

The transaction storage and search system 100 may aggregate transactions until a threshold is met. As will be described, these aggregated transactions may be utilized to update an example blockchain. The threshold may optionally represent a threshold number of received transactions (e.g., 1000, 5000, 10000, and so on). The threshold may optionally represent a threshold time period. As an example, the number of received transactions may not exceed a threshold (e.g., 1000) within a threshold time period. In this example, the system 100 may aggregate received transactions up until the threshold time period.

As part of aggregating the transactions, the transaction storage and search system 100 may generate a hash of each of the transactions. As described above, the transactions may be encrypted by the transaction storage and search system 100. Thus, the hashes may represent hashes of each encrypted transaction. As an example described herein, the transaction storage and search system 100 may aggregate 1000 transactions. Thus, the transaction storage and search system 100 may generate 1000 hashes.

The transaction storage and search system 100 may then generate four groups of the 1000 transactions. For example, the transaction storage and search system 100 may randomly select from among the 1000 transactions for each group. As another example, the transaction storage and search system 100 may utilize include transactions in the groups based on times at which the transactions were received. As another example, the transaction storage and search system 100 may group the transactions according to contextual information. In this example, the system 100 may identify transactions associated with one or more similar characteristics. An example characteristic may include identifying transactions associated with shipping. These transactions may then be included in a same group. Optionally, the transaction storage and search system 100 may receive transactions from multitudes of provider systems. In some embodiments, the system 100 may group transactions from a same provider in a same group. In some other embodiments, the system 100 may group transactions from multiple providers in a same group.

For the four groups of the 1000 transactions, the transaction storage and search system 100 may generate a hash for each group. For example, the transaction storage and search system 100 may generate a hash utilizing the 250 hashes corresponding to the 250 transactions grouped together. Thus, the transaction storage and search system 100 may generate four hashes which are referred to herein as a checkpoint hash.

The transaction storage and search system 100 may then generate two groups of checkpoint hashes. Thus, the transaction storage and search system 100 may create two groups each including two of the checkpoint hashes. The transaction storage and search system 100 may then generate a hash for each group, utilizing the two respective checkpoint hashes. The resulting two hashes are referred to herein as intermediate hashes.

The transaction storage and search system 100 may then generate a single hash, referred to as a root hash, utilizing the two intermediate hashes. The transaction storage and search system 100 may then update 142 the blockchain. For example, the transaction storage and search system 100 may implement, or otherwise function as, a node of the blockchain network. As illustrated in FIG. 1A, a block 140 may be proposed for inclusion in the example blockchain which records the checkpoint hashes, intermediate hashes, and root hash.

As further illustrated, the block 140 includes transaction signatures. With respect to the above-described example of 1000 transactions being grouped into four groups, the transaction signatures may be generated based on the encrypted transactions in each group. For example, as described above a checkpoint hash may be generated based on hashes of transactions included in a same group. In contrast, the transaction signatures may be generated based on the transactions included in a same group (e.g., a checksum may be computed, such as MD5). The four generated transaction signatures (e.g., one for each group of 250) may then be included in the block 140. In some cases, the block 140 can include a transaction signature for each transaction. In certain embodiments, the block 140 can include a transaction signature for a group of transactions, such as a group of 250 or 1000 transactions.

Thus, the transaction storage and search system 100 may aggregate transactions and generate the above-described hash and signature information from the aggregated transactions. This information may then be included in blocks of the blockchain network for recordation.

FIG. 1A illustrates a distributed storage system 120. The distributed storage system 120 may be one or more databases, such as relational databases, and may optionally be represent cloud-storage buckets. In some embodiments, the distributed storage system 120 may represent a content-addressable filesystem, such as the interplanetary file system. The transaction storage and search system 100 may store encrypted transactions and blockchain information 122 in the distributed storage system 120. For example, the storage system 120 may store information associating each encrypted transaction with one or more of a corresponding checkpoint hash, intermediate hash, root hash, transaction signature, and so on.

In this way, the distributed storage system 120 may be linked to the blockchain and represent a secure storage layer for safekeeping of information. As described below, the distributed storage system 120 may be utilized to retrieve transactions which are responsive to received search requests. The distributed storage system 120 may also be utilized to confirm that stored transactions have not been improperly tampered with. For example, the transaction storage and search system 100 may compare the information stored by the distributed storage system 120 to information recorded in the blockchain.

To enable searching of the received transactions 114, transaction features 132 of the transactions 114 may be analyzed by a search system 130. For example, the search system 130 may be an Elasticsearch system. In this example, the search system 130 may generate one or more indices 134 (e.g., inverted indices) based on the transaction features 132. The indices 134 may associate features of transactions with identifiers of transactions which include the features. In this way, received transactions may be automatically analyzed and the indices updated.

The transaction storage and search system 100 may receive search requests from outside users. For example, a user may utilize an application (e.g., an 'app') executing on a device (e.g., a tablet, mobile device, laptop, and so on) to provide search requests to the system 100. The user may additionally utilize a web application, for example via a browser executing on the user's device. The transaction storage and search system 100 may respond to complex search queries from users. For example, a search query may indicate specific features of interest to the user. Example features may include particular product information, such as a type of product, date of shipping or manufacture, specific provider, and so on. The search query may also indicate Boolean expressions, ranges of values or features, and so on. In some embodiments, the search query may be provided in natural language or by verbal command for processing by the transaction storage and search system 100, or an outside system in communication with the system 100.

The transaction storage and search system 100 may additional authenticate a user who is providing a search request. For example, the user may be required to provide authentication information, such as user name/password, an access or authentication token, and so on. This authentication step may be required by the transaction storage and search system 100 to ensure that only transactions which the user is authorized to view may be provided to the user.

The system 100 may parse a search query received from a user and utilize the search system 130 to identify responsive transactions. Since, in some embodiments, the search system 130 may store identifiers of transactions, the transaction storage and search system 100 may retrieve the corresponding transactions. For example, the transaction storage and search system 100 may utilize the distributed storage system 120 to obtain the corresponding encrypted transactions. Upon a determination that the user is authorized to access the transactions, the system 100 may decrypt the transactions (e.g., utilizing the secret key or code described above). These decrypted transactions may then be provided to the user in response to the search query.

While the above described users utilizing an application to provide search requests, it may be appreciated that the user may represent an automated or machine-based user. For example, software executing on a system or device may automatically trigger generation of a search request. The software may leverage one or more application programming interfaces (APIs) of the transaction storage and search system 100. In this way, the retrieval of certain transaction information may be performed automatically.

In some embodiments, a provider who provides transaction stream 114 to the system 100 may authorize different providers, and/or associated users thereof, to retrieve all, or a subset, of the transactions. For example, a manufacturer may allow for one or more retailers to retrieve transactions generated by the manufacturer. The transaction storage and search system 100 may therefore store authorization information indicating authorization rights for each transaction or for groups of transactions.

Figure 1B:
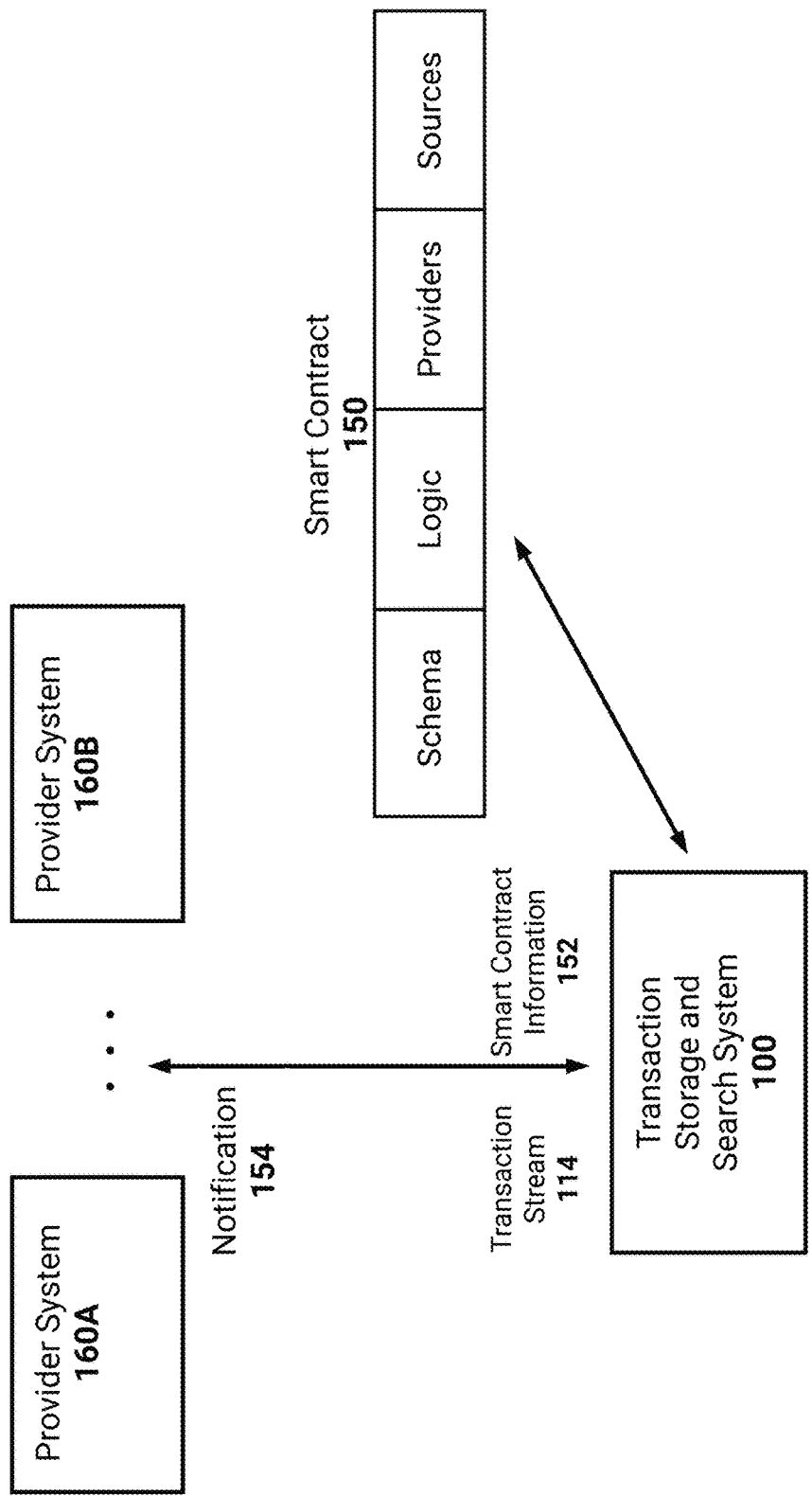
FIG. 1B illustrates the example transaction storage and search system publishing a smart contract to one or more example blockchains.

FIG. 1B illustrates the example transaction storage and search system 100 publishing a smart contract 150 to one or more example blockchains. The system 100 may optionally enable negotiations between providers 160A-160B regarding a contract. For example, the providers 160A-160B may use a user interface (e.g., a web application) to negotiate terms of a contract. Example terms may relate to aspects of a supply chain. As an example, the providers 160A-160B may negotiate a purchase order. In this example, the terms may indicate that a particular quantity of product is to be shipped by a certain date, arrive by a certain date, and so on. To ensure immutability of the contract, the transaction storage and search system 100 may publish the contract as a smart contract 150 to one or more blockchains.

As illustrated, the provider systems 160A-160B have provided smart contract information 152 to the transaction storage and search system 100. In response, the system 100 has generated a smart contract 150 which may be stored on one or more blockchains. For example, the smart contract 150 may be associated with an address. The smart contract 150 may comprise information usable to determine whether satisfaction of terms specified in the contract has occurred. For some example blockchains, a smart contract may include arbitrary logic (e.g., substantially Turing complete logic) which may be specified by the providers.

In the example of FIG. 1B, the smart contract 150 includes a schema, which may be associated with a particular blockchain network. The schema may indicate the data elements required for the execution and fulfillment of contract obligations between providers. The schema may also indicate cryptographic proofs needed to maintain the integrity and trust across counterparties and observers such as auditors or regulators. The smart contract 150 also includes logic. As described above, the logic may optionally represent an arbitrary algorithm or code block (e.g., Turing complete code). The logic may additionally represent Boolean logic, such as whether an amount of product shipped is greater than a threshold. The smart contract 150 also includes the providers associated with the contract 150. For example, the providers may include identities of participants agreeing to the terms and execution of the smart contract. The participants may be authenticated through cryptographic primitives such as digital signatures.

The smart contract 150 also includes sources. As may be appreciated, satisfaction of the smart contract 150 may depend on trustworthy information from outside sources. For example, weather information may be utilized by the logic in the smart contract 150. Thus, the parties can specify one or more outside sources from which external information is to be obtained. The sources may therefore represent external input of data or triggers required to fulfill the execution requirements of the smart contract 150. These external sources and conditions for interaction may be agreed to by the providers. As with the others, cryptographic proof may be required to prove authenticity and establish trust in the external sources.

With respect to sources, the transaction storage and search system 100 may be utilized as a source from which trusted transaction information is obtained. As described in FIG. 1A, the system 100 may receive transaction streams 114 from the provider systems 160A-160B. Thus, the system 100 may store, or otherwise access, valid transaction information from any provider associated with the system 100. In some embodiments, for example as described in FIG. 1A, the system 100 may store transaction information in a distributed storage system 120. The system 100 may then use a search system 130 to search for information stored by the storage system 120. In this way, the smart contract 150 may be executed by one or more nodes, and satisfaction of the smart contract 150 may be determined based on information stored, or otherwise accessible to, the system 100.

In some embodiments, the system 100 may analyze transaction information included in blockchains utilized by providers associated with the smart contract 150. Thus, the system 100 may monitor these blockchains and determine information usable to determine whether satisfaction of the smart contract 150 has occurred.

In some embodiments, the system 100 may automatically generate code (e.g., Solidity code) based on analyzing the received smart contract information 152. For example, the system 100 may access templates which are associated with different types of contracts. In this example, the providers may select from among existing templates of contracts. As described above, the providers may optionally use a user interface associated with the system 100. Via the user interface, the providers may select a particular type of contract (e.g., purchase order, shipping order, and so on). In some embodiments, the providers may customize, and/or combine, existing templates to create a new type of contract. Each template may be associated with certain code templates. Thus, the system 100 may update the code templates with the smart contract information 152.

Similarly, in some embodiments the system 100 may generate code using machine learning techniques. For example, the system 100 may use a neural network trained to associate certain code blocks or segments with aspects of a smart contract. As another example, the system 100 may use a neural network trained to adjust code templates based on information specified by providers.

Optionally, the system 100 may receive code associated with the smart contract 150. For example, the providers may generate the code and provide it to the system 100 (e.g., via a user interface). The system 100 may then broadcast the smart contract 150 onto one or more blockchains. In some embodiments, the system 100 may receive an address associated with the smart contract 150. For example, one of the providers may broadcast an agreed upon smart contract 150 to a blockchain. The system 100 may then receive the address and may monitor the smart contract 150 for validation.

As described above, each provider may optionally utilize their own blockchain (e.g., a private blockchain). For example, a provider may broadcast transaction information onto a private blockchain. In this way, the provider may ensure immutability of the transaction information while enabling different systems controlled by the provider to have immediate access to the transaction information. In some embodiments, the transaction storage and search system 100 may generate the smart contract 150 for inclusion in these private blockchains.

For example, the transaction storage and search system 100 may generate a first smart contract based on the received smart contract information 152 which is to be broadcast onto a first blockchain associated with provider system 160A. In this example, the system 100 may access a schema associated with the first blockchain. The system 100 may then generate a smart contract 150 according to the accessed schema and smart contract information 152. The transaction storage and search system 100 may then generate a second smart contract based on the received smart contract information 152 which is to be broadcast onto a second blockchain associated with provider system 160B. Similarly, the system 100 may access a schema associated with the second blockchain and generate the resulting smart contract. Optionally, the transaction storage and search system may utilize cross-chain techniques to broadcast a smart contract from a first blockchain to a second blockchain. Example cross-chain techniques may be based on Ripple, Polkadot, and so on.

Thus, each of the providers may optionally have the smart contract stored on their respective blockchains. In some embodiments, the transaction storage and search system 100 may include logic in each of the smart contracts 150 which allows the system 100 to determine whether satisfaction of the smarts has occurred. Thus, each provider's version of the smart contract may utilize information from the system 100 (e.g., information from transaction streams 114). One or more nodes associated with each provider's blockchain may validate the smart contract 150 based on this information.

The smart contract 150, once negotiated and agreed upon by the provider 160A-160B, may therefore be stored in one or more blockchains. As described above, the smart contract may access information from external sources (e.g., the transaction storage and search system 100, other storage systems, and so on). An example of accessed information may indicate times at which certain components of a product were created. These indicated times may be derived from a transaction stream 114 associated with one or more providers. The smart contract 150, such as a node executing the smart contract 150 (e.g., the system 100, an arbitrary compute node), may utilize these times as an input to logic specified in the smart contract 150.

The smart contract 150 may at some point in time be determined to be satisfied. In response, the system 100 may generate notifications 154 for transmission to the provider systems 160A-160B. For example, user interfaces used by users of the provider systems 160A-160B may update to reflect satisfaction of the smart contract 150. One or more results or outcomes associated with the smart contract 150 may be effectuated. For example, monetary transfer may be initiated. In certain situations, the smart contract 150 may not be satisfied or a certain error or exception may be flagged. For example, less than a threshold number of products may have been shipped. As another example, the products may have arrived after a specified date. Thus, the system 100 may customize the notifications to inform an outcome associated with the smart contract 150.

While the above description focused on a smart contract being included in a blockchain, in some embodiments the transaction storage and search system 100 may store the smart contract 150. For example, providers may assent to the system 100 validating the smart contract 150. Thus, instead of a blockchain network validating the smart contract 150, the system 100 may determine when satisfaction of the contract 150 occurs. Since the system 100 may store transaction information, it may represent a trusted system which may validate the smart contract 150. Similar to the above, the system 100 may provide notifications 154 to the provider systems 160A-160B upon satisfaction of the contract 150. Accordingly, in certain embodiments, the transaction storage and search system 100 may generate a third smart contract based on the received smart contract information 152, which can be stored at the transaction storage and search system 100.

In some cases, the smart contracts that are generated and stored to the different blockchains (or on the system 100) can match or be the same as the smart contract information 162 received from the provider systems 160A, 160B. In certain embodiments, the smart contracts can be different. For example, consider a scenario where a smart contract or smart contract information 152 received from the provider systems 160A, 160B indicates that a particular transaction is to automatically take place once certain conditions are met and that the provider systems 160A, 160B rely on two separate blockchains. In such a scenario, the system 100 can store two smart contracts on the two different blockchains. However, rather than having the smart contracts include the automatic transaction, the system 100 can generate (and post to the blockchains) smart contracts that output an indication that the requirements have been satisfied and that the transaction should take place. In some such cases, based on the indications received from both smart contracts on the two blockchains, the system 100 can execute the transaction and/or inform the provider systems 160A, 160B that the transaction should be executed (or that the contract criteria have been met).

Further, in some embodiments where a third smart contract is generated and stored on the system 100. The third smart contract can match the first and second contracts. Based on the indications from the three smart contracts, the system 100 can execute the transaction and/or inform the provider systems 160A, 160B that the transaction should be executed (or that the contract criteria have been met). In certain embodiments, the third contract can be different from the first two. For example, the third smart contract can take as inputs the outputs of the two smart contracts on the two blockchains and automatically perform the transaction based on a receipt from the two smart contracts on the blockchains that the criteria for the respective smart contracts have been satisfied.

Example Flowcharts

Figure 2:
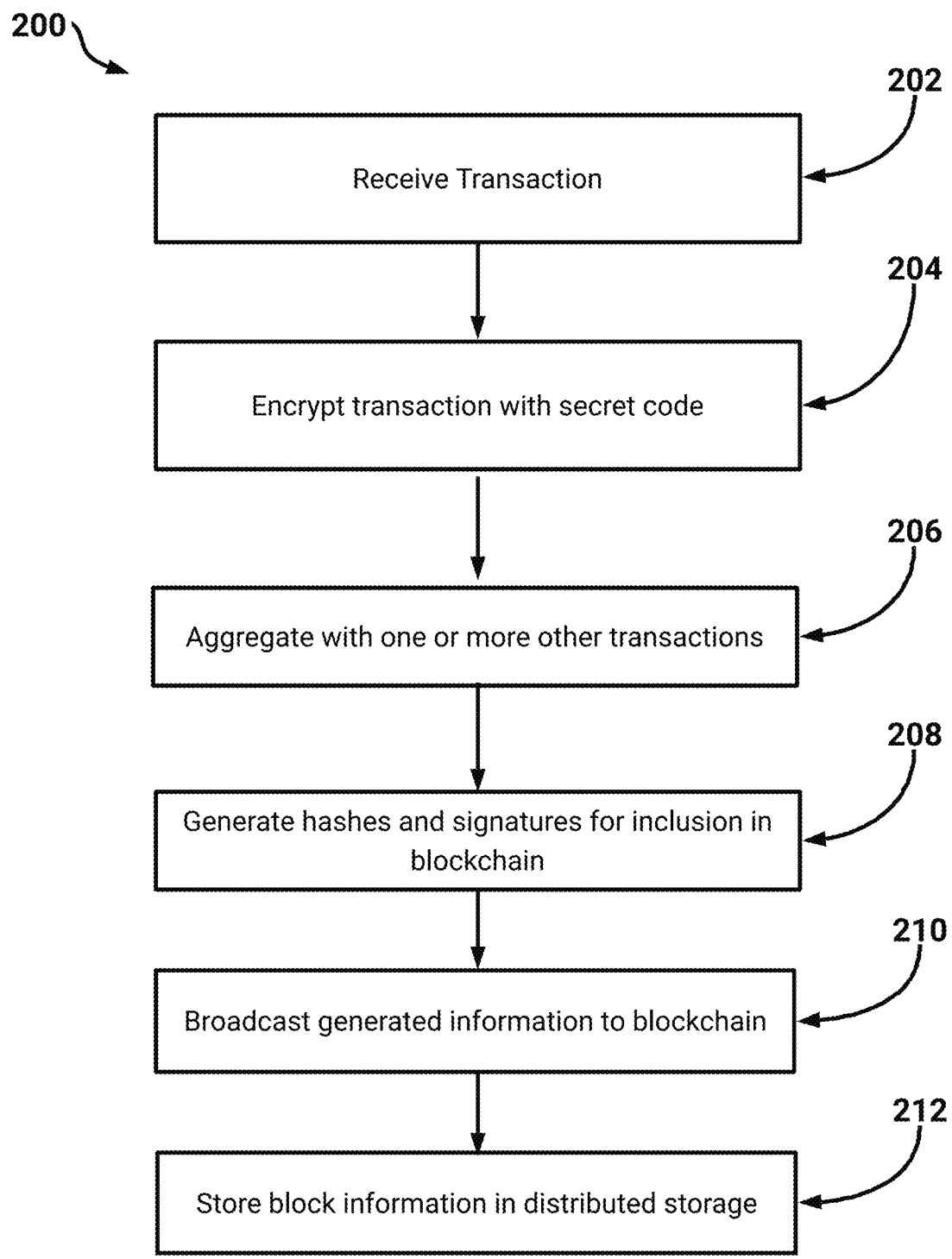
FIG. 2 is a flowchart of an example process for broadcasting information to an example blockchain.

FIG. 2 is a flowchart of an example process for publishing a block to an example blockchain. For convenience, the process 200 will be described as being performed by a system of one or more computers (e.g., the transaction storage and search system 100).

At block 202, the system receives a transaction. As described above, the system may be in communication with one or more providers (e.g., via APIs). The providers may provide (e.g., transmit) transactions for consumption by the system.

At block 204, the system encrypts transaction. The system may utilize a secret code or key to encrypt the transaction. Optionally, the transaction may be encrypted with a public key of the provider. In this way, the transaction may only be decrypted by the provider.

At block 206, the system aggregates the received transaction with one or more other transactions. As described in FIG. 1A, the system may aggregate 1000 transactions together.

At block 208, the system generates hashes and signatures for the aggregated transactions. The system may generate checkpoint hashes, intermediate hashes, and a root hash. The system may also generate signatures based on the aggregated transactions.

At block 210, the system broadcasts information to a blockchain network. The system may cause inclusion of the information in a block of an example blockchain. For example, the information may be included in Ethereum. The information also be included in Hyperledger. With respect to Hyperledger or other private blockchain networks, the system may optionally broadcast each transaction (e.g., encrypted transaction) onto the blockchain, instead of just the hashes and signatures.

At block 212, the system stores block information in storage. The system may store the encrypted versions of the aggregated transactions, along with the hashes and signatures described above, in a storage system. The storage system may be, for example, a distributed storage system.

Figure 3:
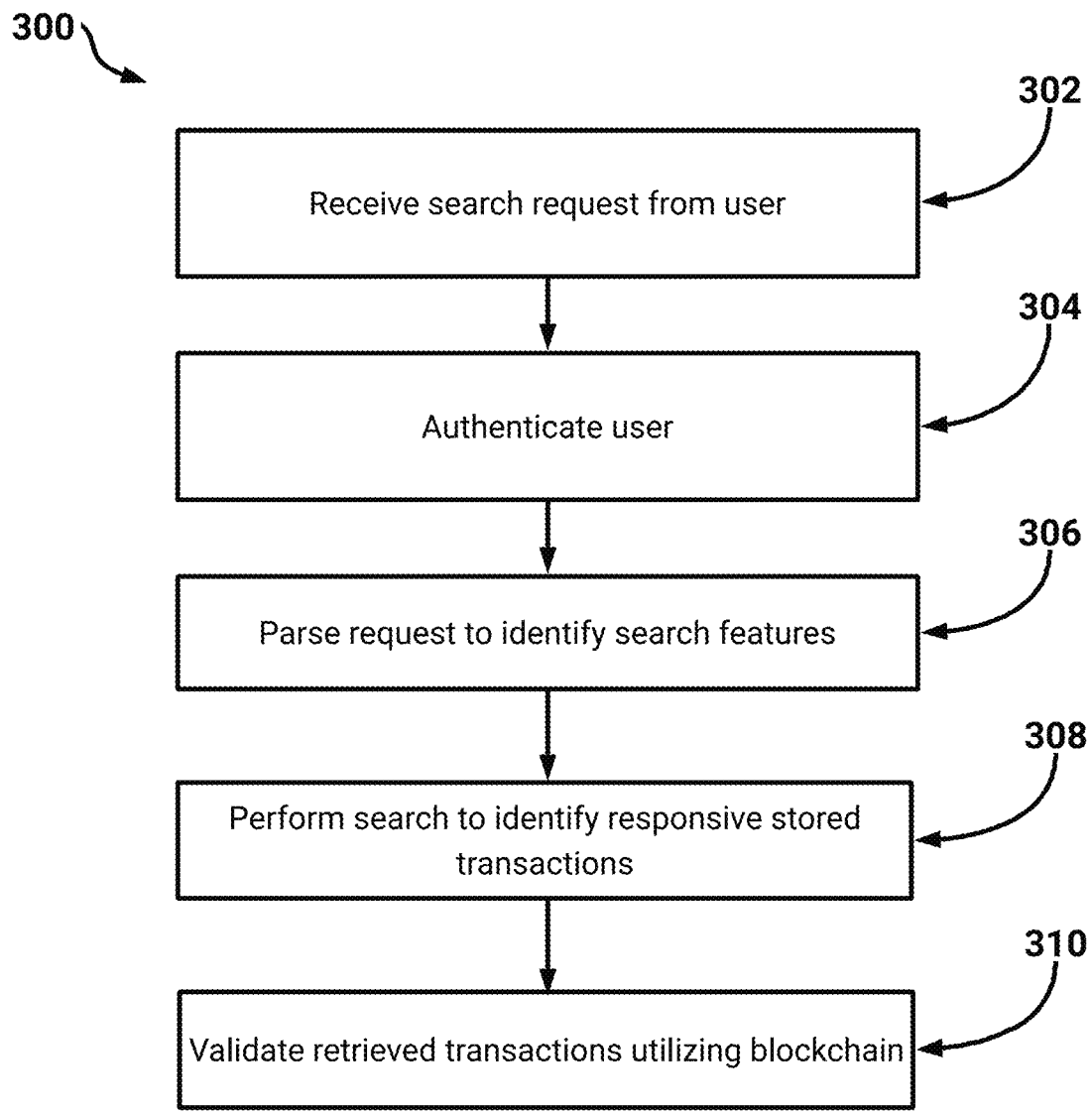
FIG. 3 is a flowchart of an example process for responding to a search request received from a user.

FIG. 3 is a flowchart of an example process for responding to a search request. For convenience, the process 300 will be described as being performed by a system of one or more computers (e.g., the transaction storage and search system 100).

At block 302, the system receives a search request. The search request may be received from a user of a user device, or may be an automated request generated by software, artificial intelligence system, and so on.

At block 304, the system authenticates the user. The system may receive a certificate, authentication token, user name/password, and so on, to authenticate the user. Optionally, the system may store profile information, or authorization information. The information may be utilized to identify transactions with the user is authorized to receive.

At block 306, the system parses the request and at block 308 the system performs the search. The system may optionally leverage Elasticsearch to identify transactions responsive to the search request. The system may then obtain encrypted versions of the identified transactions, and decrypt the transactions. In some embodiments, the system may transmit the decrypted transactions to the user in response the search request. In some embodiments, the system may upload the decrypted transactions into one or more cloud-storage buckets accessible to the user.

At block 310, the system may optionally validate transactions utilizing the blockchain. Upon identification of transactions responsive to the request, the system may optionally validate that the stored versions have not been improperly tampered with. As an example, the system may identify a group of aggregated transactions in which each identified transaction was included. The system may then re-compute the category hash for the group. This category hash may then be compared with the hashes stored in the blockchain. Optionally, the system may re-compute the transaction signature and compare it to the blockchain. If the category hash, and/or transaction signature, is distinct from that of the blockchain hash, the system may generate an alert. In some embodiments, the system may periodically ensure that all stored transactions have not been tampered with. For example, the system may re-compute the hashes, transaction signatures, described above for the stored transactions.

Optionally, the system may store a proof of transaction each time the blockchain is updated with hashes and signatures. The proof of transaction may be utilized to identify which block stores information associated with each transaction. For example, a transaction may be aggregated with other transactions as described above. Hashes and signatures may be generated for this aggregated group. The information may be included in the blockchain, and a proof of transaction received. Thus, this proof of transaction may be associated with each of the aggregated transactions.

In response to the search request, the system may provide information validating that the transactions have not been tampered with. The system may also provide the proof of transaction information for each of the decrypted transactions, thus ensuring that their information is securely stored in the blockchain.

Figure 4:
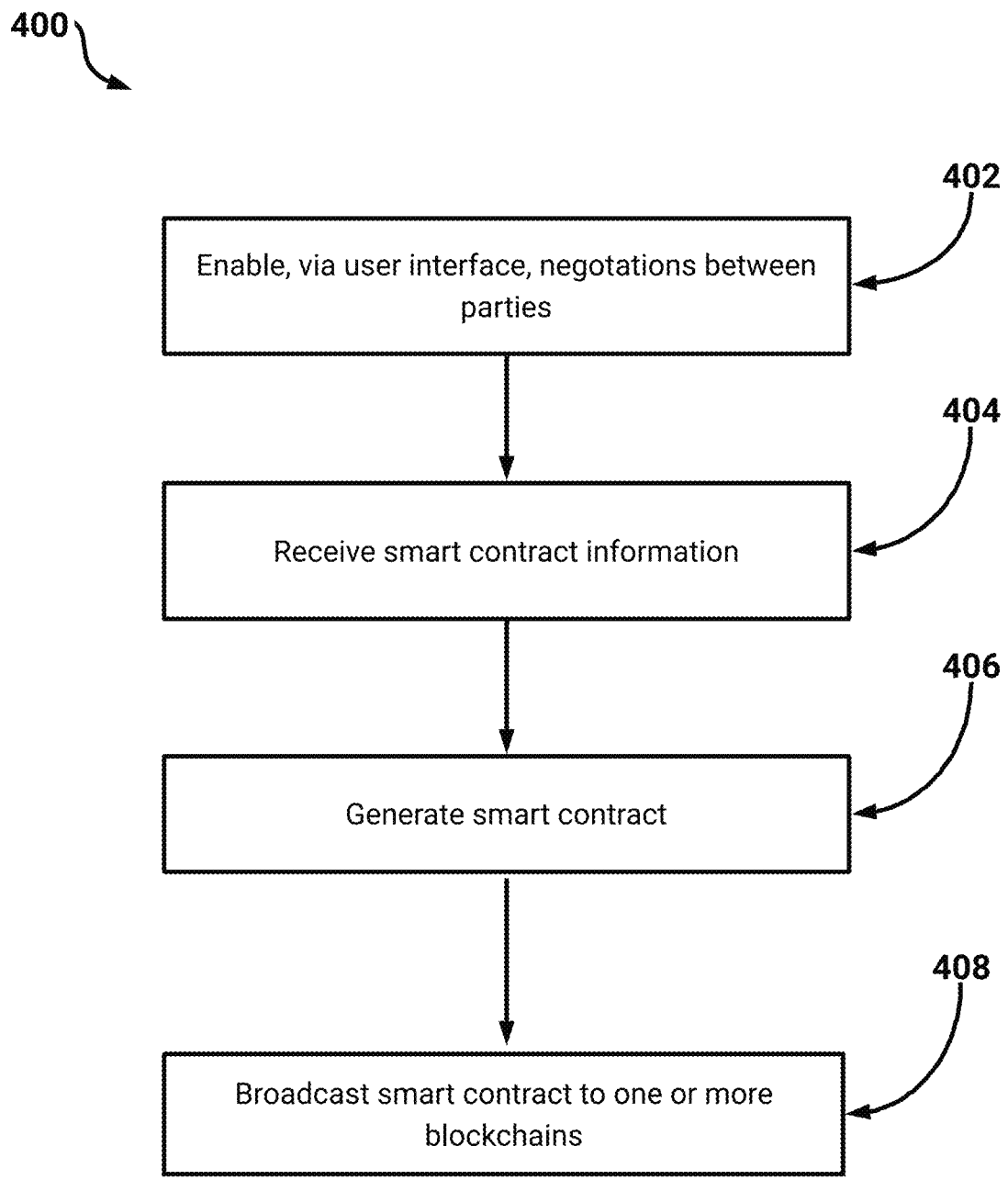
FIG. 4 is a flowchart of an example process for broadcasting a smart contract to an example blockchain.

FIG. 4 is a flowchart of an example process 400 for broadcasting a smart contract to an example blockchain. For convenience, the process 400 will be described as being performed by a system of one or more computers (e.g., the transaction storage and search system 100).

At block 402, the system enables negotiations between providers. In some embodiments, the system may be associated with a front-end user interface. For example, a web application may be accessed by user devices of the parties. In this example, the web application may allow for creation of smart contracts. As an example, the user interface may allow for selection of a type of contract (e.g., a purchase order). The user interface may then enable selection of one or more providers which are to be parties to the contract. These providers may then negotiate terms, logic, and so on, associated with the smart contract.

At block 404, the system receives smart contract information. As described in FIG. 1B, the smart contract information may reflect an indication of the providers, particular logic or terms associated with the contract, sources to be used in validating the contract, and so on.

At block 406, the system generates a smart contract. The system may generate code reflecting the smart contract information. The system may also generate code based on one or more templates associated with types of contracts. In some embodiments, the system may receive code from one or more of the providers.

At block 408, the system broadcasts the smart contract onto one or more blockchains. The system may cause the smart contract to be broadcast onto a blockchain. For example, the smart contract may be associated with an address of the blockchain. In this way, the system, or one or more other nodes (e.g., systems of one or more computers), may determine satisfaction of the contract.

In some embodiments, each provider may use their own blockchain. These blockchains may optionally be associated with different blockchain networks. Thus, the system may generate a smart contract for each of the blockchain networks. As described above, the system may utilize cross-chain techniques. The system may also generate code associated with a schema used by a respective blockchain network.

Other Embodiments

Each of the processes, methods, and algorithms described in the preceding sections may be embodied in, and fully or partially automated by, code modules executed by one or more computer systems or computer processors comprising computer hardware. The code modules (or "engines") may be stored on any type of, one or more, non-transitory computer-readable media (e.g., a computer storage product) or computer storage devices, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, for example, volatile or non-volatile storage.

In general, the terms "engine" and "module," as used herein, refer to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on one or more computer readable media, such as compact discs, digital video discs, flash drives, or any other tangible media. Such software code may be stored, partially or fully, on a memory device of the executing computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

User interfaces described herein are optionally presented (and user instructions may be received) via a user computing device using a browser, other network resource viewer, a dedicated application, or otherwise. Various features described or illustrated as being present in different embodiments or user interfaces may be combined into the same embodiment or user interface. Commands and information received from the user may be stored and acted on by the various systems disclosed herein using the processes disclosed herein. While the disclosure may reference to a user hovering over, pointing at, or clicking on a particular item, other techniques may be used to detect an item of user interest. For example, the user may touch the item via a touch screen, or otherwise indicate an interest. The user interfaces described herein may be presented on a user terminal, such as a laptop computer, desktop computer, tablet computer, smart phone, virtual reality headset, augmented reality headset, or other terminal type. The user terminals may be associated with user input devices, such as touch screens, microphones, touch pads, keyboards, mice, styluses, cameras, etc. While the foregoing discussion and figures may illustrate various types of menus, other types of menus may be used. For example, menus may be provided via a drop-down menu, a tool bar, a pop-up menu, interactive voice response system, or otherwise.

The various features and processes described herein may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "for example," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y or Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y or at least one of Z to each be present.

While certain example embodiments have been described, these embodiments have been presented by way of example only, and are not intended to limit the scope of the disclosure. Thus, nothing in the foregoing description is intended to imply that any particular element, feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated herein, it should be noted that the use of particular terminology when describing certain features or aspects of the invention should not be taken to imply that the terminology is being re-defined herein to be restricted to including any specific characteristics of the features or aspects of the invention with which that terminology is associated.

What is claimed is:

1. A computer system comprising one or more computer processors and non-transitory computer storage media storing computer executable instructions, wherein the one or more computer processors are configured to execute the computer executable instructions to:
    receive a transaction from a first provider system;
    encrypt the received transaction, and aggregate the encrypted transaction as at least part of a plurality of encrypted transactions, wherein each encrypted transaction of the plurality of encrypted transactions is reflective of a transaction associated with a supply chain;
    group the plurality of encrypted transactions into a plurality of first groups;
    generate a checkpoint hash for each group of the plurality of first groups;
    communicate the plurality of checkpoint hashes to a first blockchain system for inclusion in a first blockchain;
    store the plurality of encrypted transactions and the plurality of checkpoint hashes;
    receive smart contract information specifying logic associated with satisfaction of a contract, the smart contract information identifying the first provider system and a second provider system, wherein the first provider system is associated with the first blockchain system and the second provider system is associated with a second blockchain system;
    access a first schema associated with the first blockchain system;
    generate first code reflective of the smart contract information based on the first schema and the smart contract information;
    communicate the first code to the first blockchain system for inclusion in the first blockchain;
    access a second schema associated with the second blockchain system;
    generate second code reflective of the smart contract information based on the second schema and the smart contract information, the second code being generated for inclusion in a second blockchain by the second blockchain system, wherein the computer system is configured to respond to a search request received from a user, wherein the search request identifies particular features, and wherein the one or more computer processors are further configured to:

identify stored encrypted transactions responsive to the particular features, wherein the computer system is configured to validate stored encrypted transactions which are responsive to the search request via comparison to, at least, the plurality of checkpoint hashes included in the first blockchain.

2. The computer system of claim 1, wherein the one or more computer processors are further configured to:

group the plurality of checkpoint hashes into a plurality of second groups;

generate an intermediate hash for each group of the plurality of second groups;

generate a root hash based on the plurality of intermediate hashes; and store the plurality of intermediate hashes and the root hash.

3. The computer system of claim 2, wherein the one or more computer processors are further configured to communicate the plurality of intermediate hashes and the root hash to the first blockchain system for inclusion in the first blockchain.

4. The computer system of claim 1, wherein to generate the first code, the one or more computer processors are configured to:

access one or more code templates associated with a type of the contract, each type being indicative of a type of supply chain contract; and adjust the accessed code templates based on the received smart contract information.

5. The computer system of claim 1, wherein the specified logic indicates particular features of the stored encrypted transactions, and wherein the one or more computer processors are further configured to determine validation of the contract based on the stored encrypted transactions.

6. The computer system of claim 1, wherein the first blockchain includes encrypted transactions associated with the first provider system and the second blockchain includes encrypted transactions associated with the second provider system, and wherein the one or more computer processors are further configured to:

obtain encrypted transactions from the first blockchain and the second blockchain; and store the obtained encrypted transactions, and determine validation of the contract based, at least in part, on the stored encrypted transactions.

7. A method implemented by a computer system, the method comprising:

receiving a transaction from a first provider system;

encrypting the received transaction, and aggregating the encrypted transaction as at least part of a plurality of encrypted transactions, wherein each encrypted transaction is reflective of a transaction associated with a supply chain;

grouping the plurality of encrypted transactions into a plurality of first groups;

generating a checkpoint hash for each group of the plurality of first groups;

communicating the plurality of checkpoint hashes to a first blockchain system for inclusion in a first blockchain;

storing the plurality of encrypted transactions and the plurality of checkpoint hashes;

receiving smart contract information specifying logic associated with satisfaction of a contract, the smart contract information identifying the first provider system and a second provider system, wherein the first provider system is associated with the first blockchain system and the second provider system is associated with a second blockchain system;

accessing a first schema associated with the first blockchain system;

generating first code reflective of the smart contract information based on the first schema and the smart contract information;

communicating the first code to the first blockchain system for inclusion in the first blockchain;

accessing a second schema associated with the second blockchain system;

generate second code reflective of the smart contract information based on the second schema and the smart contract information, the second code being generated for inclusion in a second blockchain by the second blockchain system, wherein the computer system is configured to respond to a search request received from a user, wherein the search request identifies particular features, and wherein responding to the search request comprises:

identifying stored encrypted transactions responsive to the particular features, wherein the computer system is configured to validate stored encrypted transactions which are responsive to the search request via comparison to, at least, the plurality of checkpoint hashes included in the first blockchain.

8. The method of claim 7, wherein the method further comprises:

grouping the plurality of checkpoint hashes into a plurality of second groups;

generating an intermediate hash for each group of the plurality of second groups;

generating a root hash based on the plurality of intermediate hashes; and storing the plurality of intermediate hashes and the root hash.

9. The method of claim 8, wherein the plurality of intermediate hashes and root hash are communicated to the first blockchain system for inclusion in the first blockchain.

10. The method of claim 7, wherein generating first code comprises:

accessing one or more code templates associated with a type of the contract, each type being indicative of a type of supply chain contract; and adjusting the accessed code templates based on the received smart contract information.

11. The method of claim 7, wherein the specified logic indicates particular features of the stored encrypted transactions, and wherein the computer system is configured to determine validation of the contract based on the stored encrypted transactions.

12. The method of claim 7, wherein the first blockchain includes encrypted transactions associated with the first provider system and the second blockchain includes encrypted transactions associated with the second provider system, and wherein the method further comprises:

obtaining transactions from the first blockchain and the second blockchain; and storing the obtained encrypted transactions, and determining validation of the contract based, at least in part, on the stored encrypted transactions.

13. Non-transitory computer storage media storing instructions that when executed by a system of one or more processors, cause the one or more processors to:

receive a transaction from a first provider system;

encrypt the received transaction, and aggregate the encrypted transaction as at least part of a plurality of encrypted transactions, wherein each encrypted transaction of the plurality of encrypted transactions is reflective of a transaction associated with a supply chain;

group the plurality of encrypted transactions into a plurality of first groups;

generate a checkpoint hash for each group of the plurality of first groups;

communicate the plurality of checkpoint hashes to a first blockchain system for inclusion in a first blockchain;

store the plurality of encrypted transactions and the plurality of checkpoint hashes;

receive smart contract information specifying logic associated with satisfaction of a contract, the smart contract information identifying the first provider system and a second provider system, wherein the first provider system is associated with the first blockchain system and the second provider system is associated with a second blockchain system;

access a first schema associated with the first blockchain system;

generate first code reflective of the smart contract information based on the first schema and the smart contract information;

communicate the first code to the first blockchain system for inclusion in the first blockchain;

access a second schema associated with the second blockchain system;

generate second code reflective of the smart contract information based on the second schema and the smart contract information, the second code being generated for inclusion in a second blockchain by the second blockchain, wherein the system is configured to respond to a search request received from a user, wherein the search request identifies particular features, and wherein the instructions, when executed by the one or more processors, further cause the one or more processors to:

identify stored encrypted transactions responsive to the particular features, wherein the system is configured to validate stored encrypted transactions which are responsive to the search request via comparison to, at least, the plurality of checkpoint hashes included in the first blockchain.

14. The non-transitory computer storage media of claim 13, wherein the instructions, when executed by the one or more processors, further cause the one or more processors to:

group the plurality of checkpoint hashes into a plurality of second groups;

generate an intermediate hash for each group of the plurality of second groups;

generate a root hash based on the plurality of intermediate hashes; and store the plurality of intermediate hashes and the root hash.

15. The non-transitory computer storage media of claim 14, wherein the instructions, when executed by the one or more processors, further cause the one or more processors to communicate checkpoint hashes, intermediate hashes, and root hashes, are included in a block of the blockchain.

* * * * *